(12) United States Patent
Hampel et al.

(10) Patent No.: US 8,253,622 B2
(45) Date of Patent: Aug. 28, 2012

(54) DEVICE AND METHOD FOR THE IMPROVED DIRECTIONAL ESTIMATION AND DECODING BY MEANS OF SECONDARY RADAR SIGNALS

(75) Inventors: Hermann Hampel, Grosshabersdorf (DE); Ulrich Berold, Nurnberg (DE); Christoph Reck, Erlangen (DE); Lorenz-Peter Schmidt, Hessdorf (DE); Jochen Weinzierl, Nurnberg (DE)

(73) Assignee: iAd Gesellschaft für Informatik, Automatisierung und Datenverarbeitung mbH, Grosshabersdorf (DE)

( * ) Notice: Subject to any disclaimer, the term of this patent is extended or adjusted under 35 U.S.C. 154(b) by 4 days.

(21) Appl. No.: 12/918,836

(22) PCT Filed: Feb. 25, 2009

(86) PCT No.: PCT/EP2009/001351
§ 371 (c)(1),
(2), (4) Date: Aug. 23, 2010

(87) PCT Pub. No.: WO2009/106320
PCT Pub. Date: Sep. 3, 2009

(65) Prior Publication Data
US 2011/0001659 A1 Jan. 6, 2011

(30) Foreign Application Priority Data
Feb. 25, 2008 (DE) .......................... 10 2008 010 882

(51) Int. Cl.
*G01S 13/00* (2006.01)
(52) U.S. Cl. ....................................... 342/147; 342/157
(58) Field of Classification Search ........... 342/147–158
See application file for complete search history.

(56) References Cited

U.S. PATENT DOCUMENTS

| 4,109,248 A | 8/1978 | Knowles et al. |
|---|---|---|
| 4,789,865 A | 12/1988 | Litchford |
| 5,075,694 A * | 12/1991 | Donnangelo et al. ......... 342/455 |
| 7,414,566 B2 | 8/2008 | Kaltschmidt et al. |
| 2005/0024256 A1 | 2/2005 | Ridderheim et al. |
| 2008/0150784 A1 | 6/2008 | Zhang et al. |
| 2010/0141506 A1 | 6/2010 | Gulden et al. |

FOREIGN PATENT DOCUMENTS

| DE | 25 38 382 A1 | 3/1976 |
|---|---|---|
| DE | 29 11 313 A1 | 9/1980 |
| DE | 38 35 992 A1 | 5/1989 |
| DE | 197 20 828 A1 | 11/1998 |
| DE | 103 06 922 B4 | 9/2004 |
| DE | 102005000732 A1 | 7/2006 |
| WO | 2005/010553 A1 | 2/2005 |

* cited by examiner

*Primary Examiner* — Timothy A Brainard
(74) *Attorney, Agent, or Firm* — Rankin, Hill & Clark LLP (57) ABSTRACT

A device and a method for the improved directional estimation and decoding by means of secondary radar signals. The device includes: at least one array of antenna elements; a low noise first amplifier and bandpass filter combination connected to a plug-in connector S of the respective antenna elements; a first linear amplifier being connected at a filter output of said combination for amplifying the band-limited signal; a mixer connected to the first linear amplifier for the frequency conversion into a ZF region; a second linear amplifier and bandpass filter combination connected to the mixer output for amplifying and limiting the bandwidth of the signal in the ZF region; a first analog-to-digital converter connected to the second bandpass filter; a configurable signal processor connected to the first analog-to-digital converter; and a processing unit connected to the configurable signal processors.

26 Claims, 7 Drawing Sheets

DEVICE AND METHOD FOR THE IMPROVED DIRECTIONAL ESTIMATION AND DECODING BY MEANS OF SECONDARY RADAR SIGNALS

The invention concerns, according to patent claim 1, a device for the improved directional estimation and decoding by means of secondary radar signals and, according to claim 10, a method for its implementation.

Primary radar systems are radar devices, applying the radar principle exclusively and directly, i.e. direct (passive) echoes of previously transmitted high frequency pulses are analyzed. The term serves to distinguish from secondary radar systems, a method, in which echoes generated by the detected objects are actively used. In practice often a combination of both methods is used (e.g. in flights safety with ground station radar). Primary radar equipment does not expect the object to generate active signals, so that it can be detected. This is used, for example, in ensuring flights safety, because it must be possible to detect planes also in the case of damaged radar transponder. In case of interference in the used frequency, primary radar equipment can easily be adjusted to other frequencies. In secondary radar equipment, such a change may be successful only if performed also for the objects to be detected. The primary radar can find the values only by the reflected echo (e.g. direction, distance and speed), while the receiver in secondary radar can integrate additional data in its response (e.g. marking). Primary radar equipment require significantly higher transmit power than comparable secondary radar systems in order to achieve equal range.

The principle of secondary radar is a procedure for detecting the position by measuring time, which unlike normal radar equipment does not work with the energy reflecting in the target, i.e. with the passive echo of the target and on the board of the target, an active response unit (transponder) is located. In the secondary radar, targets respond actively to the received radar signal by sending a response with the same or another frequency. For this purpose, the radar pulse is received by an antenna and it transmits a characteristic "echo" by the same antenna. This response can be a specific modulation or a data package. A great advantage of secondary radar systems to primary radar systems is its apparently greater range, as well as the ability to identify the target. With primary radar, reliable information on the direction, altitude and distance of the target is received, and this occurs completely independently of the target. Secondary radar finds additional information, such as marking, identification and also the altitude of the target. In any case, support by the target is necessary. If there is no such support, for example, if the transponder is defective, the secondary radar cannot work and this flying object is not detected. That is why most secondary radar systems operate in combination with a primary radar system. In 1953, the international standard Mark X was formulated (this system was quite simply structured and worked at a frequency of 950 MHz to 1150 MHz on 12 different channels with an interval of 17 MHz) and it was extended many times until 2008, as now it is a basis for civilian use of the secondary radar in aerial safety. In older literature, the terms Super Beacon and Discrete Address Beacon System (DABS) are still used as former designations for the procedure of the S mode in the standard Mark XII.

As a rule, the secondary radar system consists of two devices: an interrogating device (interrogator) and a response device (transponder). In air traffic interrogators are partly ground stations, partly interrogators mounted on airplanes. The interrogator sends independently of the type of modulation (so called mode) a question, encodes with different pulses. These pulses are received by the transponder and are evaluated. According to the contents of the question, a reply is generated, which is encoded again and which is transmitted. By the means of echo-time measurement between transmitted pulses and the response, the distance between the interrogating device and the responding device can be calculated. Because of delays caused in the transponder due to encoding and decoding, this calculation of remoteness is correct only when the additional time of delay is known. As a transfer protocol, which is generally sent at 1030 MHz, pulse modulation with differential phase shift keying (DPSK) is used along the so-called uplink path (interrogation from ground station high to the airplane) within the P6 pulse. The response in most modes lasts for 20.3 µs, consists of 2 to 15 pulses with pulse duration of 0.45 µs (±0.1 µs) each, possesses only one spare value of 4096 different codes for identification due to the used four-position octet code and is transmitted at frequency 1090 MHz. Along the downlink path (response from the airplane to the interrogator) differential phase shift keying (DPSK) is not advantageous to be used. The security of transfer is affected adversely by extreme fluctuations in temperature to which the transponder is exposed at high altitude of flight. That is why a rarer modulation is used, pulse position modulation (PPM). A feature of a Mode S transponder is the so called squitter mode, where the transponder regardless of interrogation sends at regular intervals for example the GPS position and identification (ADS-B Automatic Dependent Surveillance-Broadcast).

From DE 25 38 382 A1, a secondary radar system (SSR) is known, in which there is no need for a rotating antenna for receiving the response, requested from the transponder. The procedure for identifying and/or determining the location of an airplane is characterized by the fact that first, a pair of pulses for interrogation is transmitted in a band of the transponder field, which determines the position of the transponder being searched and which is used to suppress all other signals from other transponders, a pair second of pulses for interrogation of the transponder being searched is transmitted, at which the transponder being searched is preferably interrogated when the other transponders are suppressed, and the response sent by this transponder is received for identification and/or detection of location. An alternative method of the invention consists of the fact that the time relationship between the pulses of the first pair of pulses changes in stages, so that the predetermined region is passed through stages, in which it is preferable that the region is passed in a series of bands in one direction, and then in the same way in the other direction. A device according to this method is in a first alternative characterized with first and second antennas placed at the end of the region and available for each other and thus facing each other, so as to transmit a certain pair of first pair of pulses for interrogation, and there is also a third antenna, which is placed on the edge of the region, and the third and the first or the second antenna are located so as to transmit certain pairs of pulses for suppression. In addition, a further alternative is characterized by the fact that the first and second antennas, which are located on the edge of the region, are positioned to each other and at such a distance so as to transmit certain pairs of the first pair of pulses for interrogation, and the third and the fourth antennas are located on the edge of the predetermined area so as to transmit certain signals for suppression. The third antenna can be located in such a way that the response from the transponder being searched is received by it; it is possible that at least three of the antennas are located so that the respond from the transponder being searched is received to determine its position within the predetermined region. The position of the airplane can, as described above, be determined by the frame pairs of pulses of the response of the transponder, but more accurate position of the transponder can be obtained, if each antenna receives the response of the selected airplane and for determining the position of the airplane a tripartite procedure is used. Expansion is obtained by providing a fourth antenna used along with other antennas for sending suppressing pulses. Thus, a greater accuracy of suppression is achieved, whereupon the characteristic of insensitivity of the original transponders leads to a relatively low resolution. This problem is minimized by the use of dual suppression procedure, in which initially all located on a given hyperbola transponders, and then all the transponders at the airport are suppressed. When initially suppressed transponders are free again (i.e. after a period of suppression of 35 μs), but before the other transponders become free, a selected the part from the selected hyperbola is requested for activation of the transponder located in this part. The entire airport can be scanned by this, if this method is repeated and the request of different parts of hyperbole one after another is fulfilled, as the time relation with the initial pulse for suppression is changed so that all other hyperbolas are requested one after another. By comparing the position found by the tripartite procedure with the position to which the request was directed, it is possible to a large extent to eliminate the interfering responses that arise on the basis of reflections, asynchronous responds (fruit), adverse actions of transponder (squitter), modular reflections, responses in the wrong mode, etc. This elimination will not affect the accuracy of the position of the other responses.

Further, from DE 29 11 313 A1, a monitoring system for airports with a secondary radar system using three receivers set on the edge of the airport, with one receiving antenna controlled by phase to implement a sharply curved receiving funnel, and with calculation by the means of procedure for hyperbola location, is known. In order to implement in each case a precise detection of location of the airplanes and the vehicles with identification at the airport, it is necessary that the signals coming from the response stations to be obtained from a second antenna located on the airport at a good distance from the interrogation antenna, which forms a sharply converging antenna, which also scanned the airport and the transmissions generated by these two antennas shall be directed in such a way that their zone of intersection cover each point of the airport sequentially, and thus, by the means of the zone of intersection to determine the position of the plane. An alternative way to solve the task to receive the transmitted by the response stations response signals from two or more circularly transmitting antennas placed on the airport and placed far apart from the interrogation antenna, as from the difference in the path of the response signal to the individual circularly transmitting antennas the position of the respective airplane is calculated by the means of the procedure for hyperbola detection of location. Improving in accuracy with regard to detection of location is achieved by receiving, on one hand, response signals sent by the response stations for response from the second antenna located far apart from the interrogation antenna located on the airport, which, however, forms sharply curved funnel, and which inspects the airport, and whose response signals are directed by the two antennas through the funnel for transmission, so that the zone of intersection detects each point of the airport; thus, by the means of such zone of intersection, the position of the airplane can be determined, and on the other hand, the response signals coming from the response stations are received by two or more circularly transmitting antennas distributed on the airport and located at a distance from the interrogation antenna, and the position of the respective airplane is calculated using the hyperbola location procedure.

Further, from DE 38 35 992 A1, a system for preventing collisions with finding the position in its home station is known, which by SSR interrogations and responses determines the positions of its home station and the positions of the other stations. In particular, the starting position of its home station is determined by active measuring the distance to the transponders of the other stations, whose subsequent responses to interrogations of its home station are free of interference, caused by overlap of the responses. Such interference must be described as a block. To determine the identity and the altitude of the other stations, unblocked responses are chosen and their delay with respect to interrogations is a measure of the direct distance from the other stations to the home station. To ensure the measurement of distance to another identified station, the home station sends a short signal with repeated interrogations from mode A and mode C and correlates them with the received responses. If the transponder responds without blocking to more than one station, then that station which is best situated to determine the exact position is selected. It is not necessary to follow the adjustments of its own position. All interferences of the existing ATCRBS mode from interrogations from of its home station and responses to them are only superficial and can be ignored as a whole. The positions of the home and the other responding stations are determined in a trigonometric way by the measured distances and the bearing differences, and from the time differences at the arrival of the interrogations from the SSR station and from the next unblocked responses to these interrogations from the above mentioned identified transponders from the other stations. Once the position of the home station is determined through active transmissions combined with passive data then the relative positions of other transponder stations are determined passively.

Further, from DE 197 20 828 A1 a system with fixed antennas to direct and control airplanes on the airports and in the control zone based on the Mode S is known, in which by a combination of distance measurement and hyperbola calculation procedure, airport stations are moved, together with the entire control zone, in order to locate, identify and communicate with arriving and departing airplanes, with circling airplanes and those moving on the runway. All involved stations only need fixed antennas with a circular characteristic. The combination of at least three receiving stations with fixed antennas reception characteristics of Mode S transponders from airplanes and of squitter coming from them, respectively response, and from one transmitting station which is interrogating the airplane transponders also with fixed antennas characteristics makes the setup that relates the hyperbola principle, respectively, pseudo orange detection of location with the principle of dual-channel measurement of distance, so that airplanes can be localized with high precision and high updating both on all landing places at the airport, and in nearby area (e.g. control zone), and also be uniquely identified and makes possible to exchange data with them. In particular—when medium range radar or radar for the segment cover higher altitude over the airport—the use of an expensive airport ASR radar with rotating antennas for measuring distance can be omitted. Instead of the airport radar with rotating antennas for measuring distance, a combination of hyperbola procedure and measuring the distance and the precise location results with apparently higher rates of renewal may be offered.

Further, from DE 103 06 922 B4 a device for control at the airport is used at radar devices, which have cluster sensitivity to ground, which is low, and these radar devices can simultaneously control the airspace and ground space at the territory of the airport. In particular, a device for detecting obstacles and controlling movements on and over the territory of the airport by sensors is territory implemented, where one sensor is a radar device with multiple antenna elements that are placed on the curved surface of the mounting of the antenna and they are run one after another at intervals, whereupon the antenna elements are arranged in circles and the first circle and the second circle form a plane, whereupon the planes formed by the circles stand vertically to one another and whereupon the antenna elements located in one horizontal plane are intended to control the airspace and to determine the altitude of flying of taking off or landing flying objects, respectively by ROSAR principle and there is another sensor which is a ROSAR radar device, which by rotating the antenna forms a synthetic aperture, whereupon the device is positioned on the take off and landing band. Besides, elements of ROSAR radar device are controlled and turned off at intervals one after another. By the means of an antenna element situated in a horizontal plane, the control of the territory of the airport is implemented, and by antenna elements located in a vertical plane, the control of the airspace of the airport is implemented. Moreover, using the device, it is possible to determine the altitudes of flying of landing or taking off flying objects. On the basis of high resolution of altitudes, contrary to well known devices, there is no need for transponders with secondary radars in the observed flying objects. A secondary radar system may not be placed on the ground, either.

Further, from DE 10 2005 000 732 A1 a radiobased location system with synthetic aperture is known, characterized with the following:
  using data from the measurement of absolute sensors and relative sensors, detects motion from starting position of the mobile station,
  using data from the measurement, generates a virtual antenna in the form of synthetic aperture, and
  based on the use of synthetic aperture, subsequent focusing to the mobile station on the located station and/or vice versa is performed.

By the use of synthetic aperture, by selecting a specific aperture size and/or assessment of the amplitudes and/or phases, from the measuring data the absolute sensors, approximate behaviour of the synthetic aperture is prepared, so that the guide chart is homogeneous in the range of error ellipse of a random previous measurement of the position.

Finally, from US 2005/0024256 A1, a passive system to prevent collisions is known and also a procedure by which, in an equipped with GPS surveillance airplane, responses from the airplanes located in the control zone, sending those to the ground station, are assessed. For this purpose, on the surveillance airplane, a linear or a circular antenna group with steering antennas with equal distances between the antennas, where the output signals of the antenna elements in 1.090 MHz range are passed to a recipient connected to an analog-to-digital converter. The signals at the output of the analog-to-digital converter in the complex main band are fed to a single digital signal processor, which establishes whether a valid signal is received from the mode A or C and which filters all signals that are not related. Lying on the output DSP signal which includes all valid information from Mode A or C, namely the relevant identification of the target transponder and altitude data, is supplied with the own GPS data via USB cable to an onboard laptop, PDA or notebook located on the surveillance airplane. The assessment of the direction, performed in the laptop, PDA or notebook, that is based on GPS data and the responses from the targeted airplanes, located in the range of surveillance (echo-time measurement between transmitted pulses from the ground station and the response from the relevant target airplane for assessment of the distance between the ground station and the target airplane), may be done for example by the procedure for assessment ESPRIT, MUSIC (Multiple Signal Classification), WSF (Weighted Subspace Fitting) and the result may be presented on a screen attached to the pilot's leg. In this echo-time measurement the relative distance "c" between the surveillance airplane and the target airplane, as well as the angle $\alpha$ between the segment "Surveillance airplane and ground station" and the segment "Surveillance airplane and target airplane (when taking into account the time delay for preparation of the response in the target airplane). In order to decrease the number of recipients, switching steering antennas of the group of antennas can be provided and the pilot may be additionally warned of the collision by a voice signal, for example, "Target airplane at 10 o'clock down and close" or "Target airplane at 2 o'clock up and close" or by a warning signal (with an appropriate tone pitch). The accuracy of assessment of direction depends on many factors, such as the signal-to-noise ratio SNR, number of measurements, number of signals to be received (responses), the angular resolution between the different signals, the deviation of the antenna response from the angle, the deviation of the ideal antenna group (generation error) and the possibility of systematic calibration.

The above discussions of prior art shows that radiobased location systems based on secondary radar signals are known. Here, on one hand, special reception systems are used for the purpose of assessing the direction and, on the other hand, special systems for decoding the secondary radar signals. In particular, no secondary radar device is present, where the disadvantages of hardware used, such as connected antenna elements, different impedances of the reference point, deviating distances between antenna elements, production and assembly tolerances, etc. are taken into account.

It is, therefore, an object of the present invention to implement a radiobased location system in a way that allows for improved assessment of the direction, including decoding based on secondary radar signals. Further, location system must provide opportunity of expanding on the purpose of determining the position.

In accordance with claim 1, this problem is solved by a device for the improved directional estimation and/or decoding by means of secondary radar signals, which comprises:
  at least one array comprising M antenna elements,
  a low noise linear amplifier and bandpass filter combination connected to a plug-in connector of the respective antenna element, at the filter output of said combination a first linear amplifier being connected for amplifying the band-limited signal,
  a first bandpass filter connected to the low noise linear amplifier, to whose filter output a linear amplifier for amplifying of the signal limited in the band is connected,
  a mixer connected to the first linear amplifier for the frequency conversion into a ZF region,
  a second linear amplifier and bandpass filter combination connected to the mixer output for amplifying and limiting the bandwidth of the signal in the ZF region,
  a first analog-to-digital converter connected to the second bandpass filter for scanning and quantifying the filter output signal,
  a configurable signal processor connected to the first analog-to-digital converter, said processor being connected to a PLL-VCO circuit for controlling the mixer frequency and receiving the data for processing, a processing unit connected to the configurable signal processors, said unit collecting the data from all antenna elements and carrying out the directional estimation by means of a method based on a subspace, so that the various gains, phase differences and coupling of antenna elements in the analog input devices connected to the M antenna elements to be taken into account both in estimating the direction and in the detection of the received radio data.

Furthermore, in accordance with claim 2, this problem is solved by a device for determining the position and/or decoding based on secondary radar signals in accordance with patent claim 2; this device comprises:

at least two arrays comprising of M antenna elements,
a low noise linear amplifier and bandpass filter combination connected to a plug-in connector of the respective antenna element, at the filter output of said combination a first linear amplifier being connected for amplifying the band-limited signal,
a first bandpass filter connected to the low noise linear amplifier, to whose filter output a linear amplifier for amplifying of the signal limited in the band is connected,
a mixer connected to the first linear amplifier for the frequency conversion into a ZF region,
a second linear amplifier and bandpass filter combination connected to the mixer output for amplifying and limiting the bandwidth of the signal in the ZF region,
a second linear amplifier and bandpass filter combination connected to the mixer output for amplifying and limiting the bandwidth of the signal in the ZF region,
a first analog-to-digital converter connected to the second bandpass filter for scanning and quantifying the filter output signal,
a configurable signal processor connected to the first analog-to-digital converter, said processor being connected to a PLL-VCO circuit for controlling the mixer frequency and receiving the data for processing, and
a processing unit connected to configurable signal processors, which collects data from all antenna elements and makes an assessment of the direction by a subregionally based procedure,
a central processing unit connected to the processing units of the arrays which collects information on the estimation of direction from the connected processing units and determines the position by means of cross bearing,
so that the various gains, phase differences and coupling of antenna elements in the analog input devices connected to the M antenna elements to be taken into account both in estimating the direction and in the detection of the received radio data.

Furthermore, in accordance with claim 10, this problem is solved by a method for the estimation of the direction and/or decoding of secondary radar signals, with at least one array comprising M antenna elements and connected to the M antenna elements analog input devices with linear amplifiers, band filters, a mixer, analog-to-digital converters, configurable signal processors and a processing unit, the method comprising:

generating by one of the signal processors first and second clock signals as a normal time for the mixer and analog-to-digital converter,
applying a coherent analog and digital signal processing in the processing unit connected to the signal processors, which collects data from all antenna elements and makes an estimation of the direction by a method based on a subspace and taking into account various gains, phase differences and coupling of antenna elements in the analog input devices connected to the M antenna elements both in estimating the direction and in detecting of the received radio data.

Other advantages and details can be seen in the below description of a preferred embodiment of the invention and the accompanying drawings. The drawings show:

FIG. 1 Block circuit diagram of a first embodiment,
FIG. 2 Circuit diagram of the antenna elements
FIG. 3 RMSE through the carrier offset,
FIG. 4 The results of the simulated antenna coupling between antenna elements
FIG. 5 RMSE for the standard deviation of the absolute values of amplification of input levels, normalized to its nominal gain,
FIG. 6 RMSE for the standard deviation of the phases of input levels, normalized to $\pi$
FIG. 7 RMSE for the assessment of the direction with a parameterized simulation model, based on values measured by the hardware through the carrier offset
FIG. 8 Histogram of errors in the assessment of the direction with ESPRIT, based on 2000 received ADS-B messages
FIG. 9 Histogram of errors in the assessment of the direction with NC Unitary ESPRIT, based on 2000 received ADS-B messages
FIG. 10 Schematic system picture for determining the position based on the assessments of the direction from several groups
FIG. 11 The error in the assessment of the direction to the angle of incidence for ESPRIT based on 14 222 ADS-B messages with and without calibration, and
FIG. 12 Histogram of errors in the assessment of the direction for ESPRIT based on 14 222 ADS-B messages with and without calibration.

The secondary radar at 1090 MHz is used for identification purposes and transmission of common data for the flight between the flying objects, ground vehicles and the safety of flight. Currently, works are done on the task of application based on a concept of multilateration in the range of the determination of the position.

The construction of a multilateration system is a difficult task. The times of arrival of the signal must be determined very accurately and accurate synchronization of all the receivers involved must be prepared. Moreover, the system is sensitive to intersymbol interference (ISI). This is an algorithm known by E. Piracci, N. Petrochilos and G. Galati, "Single-antenna Projection Algorithm to discriminate superimposed Secondary Surveillance Radar Mode S Signals" in EURAD, 2007, which reduces the effect of ISI, but it is based on a data model where exceptionally signals from S mode are taken into account.

An antenna array for estimation of direction can improve the effectiveness of multilateration system and replace it for short distances.

Figure 1:
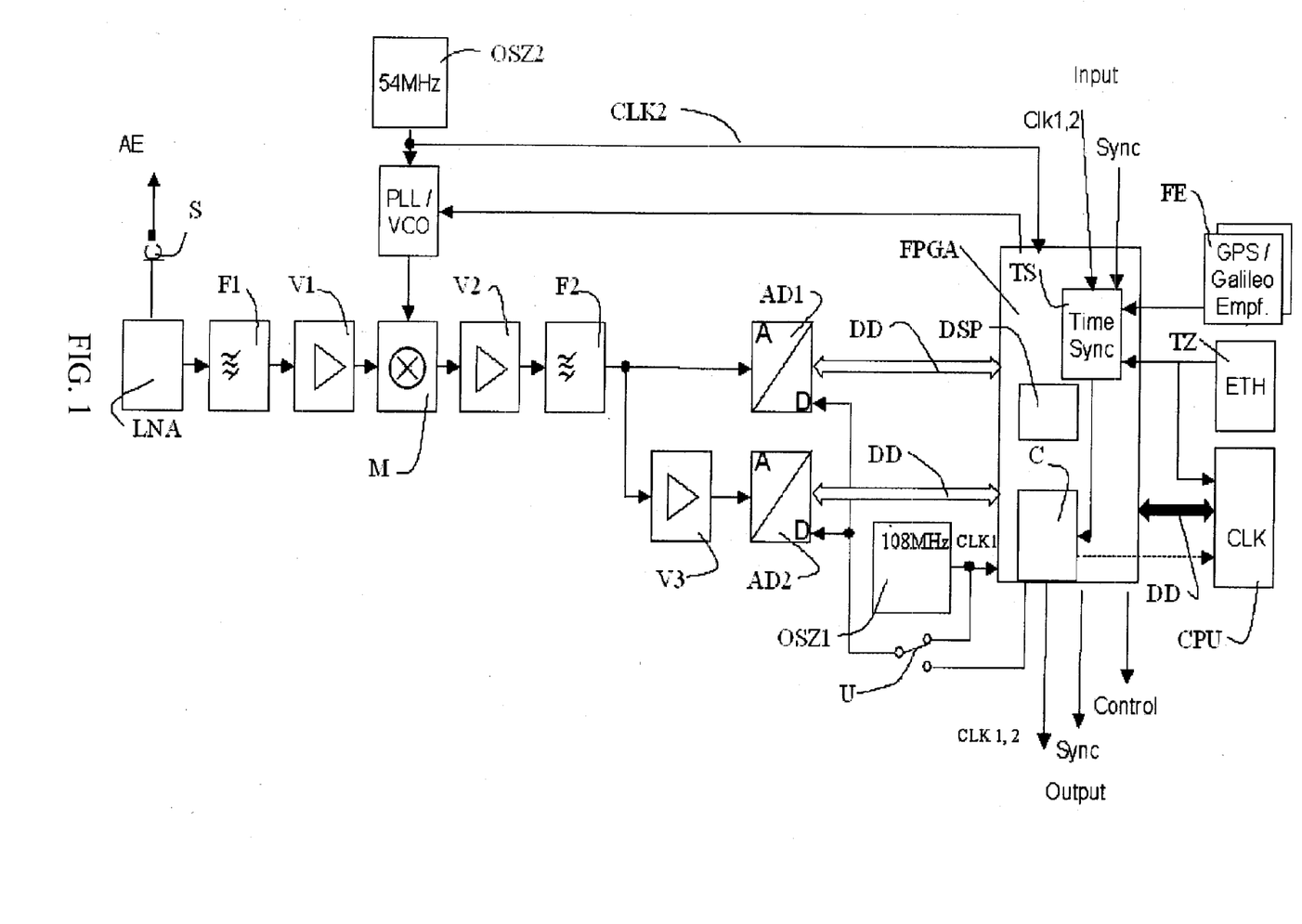

FIG. 1 shows the block circuit diagram of the first form of implementation of the equipment for estimation of direction and/or decoding of the secondary radar signals, which comprises:

at least one array A comprising M antenna elements AE,
a low noise linear amplifier LNA and bandpass filter F1 combination connected to a plug-in connector S of the respective antenna element AE, at the filter output of said combination a first linear amplifier V1 being connected for amplifying the band-limited signal, a first bandpass filter F1 connected to said low noise linear amplifier LNA, to whose filter output a linear amplifier V1 for amplifying of the signal limited in the band is connected, a mixer M connected to the first linear amplifier V1 for the frequency conversion into a ZF region, a second linear amplifier V2 and bandpass filter F2 combination connected to the mixer output for amplifying and limiting the bandwidth of the signal in the ZF region, a first analog-to-digital converter AD1 connected to the second bandpass filter F2 for scanning and quantifying the filter output signal, a configurable signal processor FPGA connected to the first analog-to-digital converter AD1, said processor being connected to a PLL-VCO circuit for controlling the mixer frequency and receiving the data for processing, a processing unit CPU connected to the configurable signal processors FPGA, said unit collecting the data DD from all antenna elements AE and carrying out the directional estimation by means of a method based on a subspace, so that the various gains, phase differences and coupling of antenna elements in the analog input devices connected to the M antenna elements AE to be taken into account both in estimating the direction and in the detection of the received radio data.

Preferably, the second linear filter F2 shall be connected to a third linear amplifier V3 to amplify the signals from the low level, for which the second analog-to-digital converter AD2 is connected. The second analog-to-digital converter AD2 with the corresponding amplifier is intended to increase the dynamics of the system, as the needed dynamics is higher than the dynamics of the present analog-to-digital converter.

In a further embodiment according of the invention, the antenna array A consists of at least three omnidirectional antenna elements AE, which, except of MUSIC, are formed as a linear array A with equal distances between the antennas of half a wavelength. The antenna element AE is equipped with a reflector in the form of half way tube with a diameter of half a wavelength, serving for both adapting and decoupling. Alternatively, antenna elements AE are formed as frame antennas on a bearing plate and the rear side of the holder has a metal surface for shielding. For supplying the time synchronization of configurable signal processors FPGA/DSP, a radioreceiver FE is connected to them (e.g. for reception of GPS or Galileo signals) and/or an interface switching TZ connected via a cable (for example, to connect an Ethernet connection).

In an embodiment according to the invention, one of the signal processors FPGA generates the first and second clock signals CK1, CK2 as time for the mixer M and analog-to-digital converters AD1, AD2 and a coherent analog-to-digital signal processing is done in the processing unit CPU connected to the signal processors FPGA, which collects data DD of all antenna elements AE and performs estimation of the direction by a method based on a subspace.

As a subspace based method, either Multiple Signal Classification (MUSIC), or Estimation of Signal Parameters via Relational Invariance Techniques (ESPRIT), or Non-Circular (NC) Unitary ESPRIT, or Matrix Pencil is used. In the method for estimation of the direction according to MUSIC, the directions of falling are not directly calculated, but the so-called pseudospecter from which the directions of falling are determined is found. In the mixer M mixing takes place in the complex equivalent main band, as well as subsequent depth filtration. Preferably, ADS-B messages that contain the position of the airplane established by fixed location by a satellite (Global Position System GPS) on board are used as a reference. The method according to the invention is particularly characterized by the use of estimation of the direction and/or estimation of the altitude. In addition, the information on the position and the data of movement are assessed in the processing unit CPU, contained in the signal processors FPGA as a positional information system for detection/processing. Signal processor FPGA, after setting a defined time or when reaching a predetermined distance, provide one or more position data and send them in a package (of data) to the processing unit CPU. Preferably, the data package shall be saved in the processing unit CPU at certain intervals circularly/cyclically.

The course of signal processing in the equipment according to the invention for estimation of the direction and/or decoding of secondary radar signals can be summarized as follows:

Reception of signals (at 1090 MHz) by the antenna array A,

Linear amplifying (20 dB) with a low noise pre-amplifier LNA (possibly selective amplifier with a frequency range of 1090 MHz)

Filtering by a bandpass filter F1 (1090 MHz) and amplifying by the amplifier V1, Frequency conversion by a mixer M in the intermediate frequency range (86 MHz). Control signal (1004 MHz) for the mixer is obtained using a combination of PLL/VCO.

Linear amplifying (17 dB) with the amplifier V2 and filtering with a bandpass filter F2 (86 MHz)

Extension of the signal in two ways,

Linear amplifying (45 dB) and analog-to-digital conversion by the first analog-to-digital converter AD1 (16 bits evenly, 108 MHz sampling frequency) in the first path, Direct analog-to-digital conversion by the second analog-to-digital converter AD2 (16 bits evenly, 108 MHz sampling frequency) in the second path, Digital signal processing in FPGA: conversion into a complex base band, low pass filtering and reduction of data, as well as transmission to the common processing unit CPU.

The processing for finding the angle of falling (azimuth/elevation) first takes place in the common processing unit CPU. The above values for intermediate frequencies, the sampling frequencies, widths and amplifying factors are preferably used, but there are also free parameters with regard to system optimization. For the proper functioning of the system, the control signals and a clock from the mixers and from the analog-to-digital converters between separate channels must be synchronized.

The obtaining of d plane waves from one array/group A consisting of M antenna elements AE is represented by multiplication of two matrices and an additional noise value:

$$X = A \cdot B + N. \tag{1}$$

X (M×N) describes the reception matrix, and A (M×d) represents the matrix for forming the beam (steering matrix). If the distance between antenna elements is half a wavelength, then $$A = \begin{bmatrix} 1 & 1 & \ldots & 1 \\ e^{j\pi \cdot \sin(\phi_1)} & e^{j\pi \cdot \sin(\phi_2)} & \ldots & e^{j\pi \cdot \sin(\phi_d)} \\ \vdots & \vdots & \ldots & \vdots \\ e^{j\pi \cdot \sin(M\phi_1)} & e^{j\pi \cdot \sin(M\phi_2)} & \ldots & e^{j\pi \cdot \sin(M\phi_d)} \end{bmatrix}.$$

Matrix B (d×N) contains the symbols for transmission. The angles $\phi_n$ with $d \cdot \in \{1, 2, \ldots, d\}$ describe the angles of the received signals. The matrix N presents the additional white noise.

Since the SSR standard provides allowable compensation of the holder of ±3 MHz in Mode A/C, there must be an additional phase shift over time. This phase shift is modeled by the matrix F (d×N). The reception model is extended to $$X = A \cdot (F \otimes B) + N, \quad (2)$$

where ⊗ presents the product of the elements of the two matrices.

This reception model defines a group of antennas A of ideal isotropic antenna elements AE, followed by coherent analog and digital signal processing, where the algorithms for assessment of the direction must virtually work with a group which has connected antenna elements, different impedances of the reference point and deviating distances between the elements. Tolerances of implementation and installation lead to different amplifications and differences in the phases (respectively variable number of noises) in the analog input levels. These shortcomings of the hardware in use must be taken into account in the reception model. Connecting the antenna elements, different impedances of the reference points and various amplifications, respectively, phase course can be represented by the coupling matrix C (M×M)

$$C = \begin{bmatrix} c_{11} & c_{12} & \ldots & c_{1M} \\ c_{21} & c_{22} & \ldots & c_{2M} \\ \vdots & \vdots & \ldots & \vdots \\ c_{M1} & c_{M2} & \ldots & c_{MM} \end{bmatrix} \quad (3)$$

The values of the principal diagonals amount to $c_{nn}=1$ for the case of ideal coherent analog input levels for all channels. Otherwise, these elements acquire values proportional to the channel-specific amplifications and phase inputs.

Figure 2:
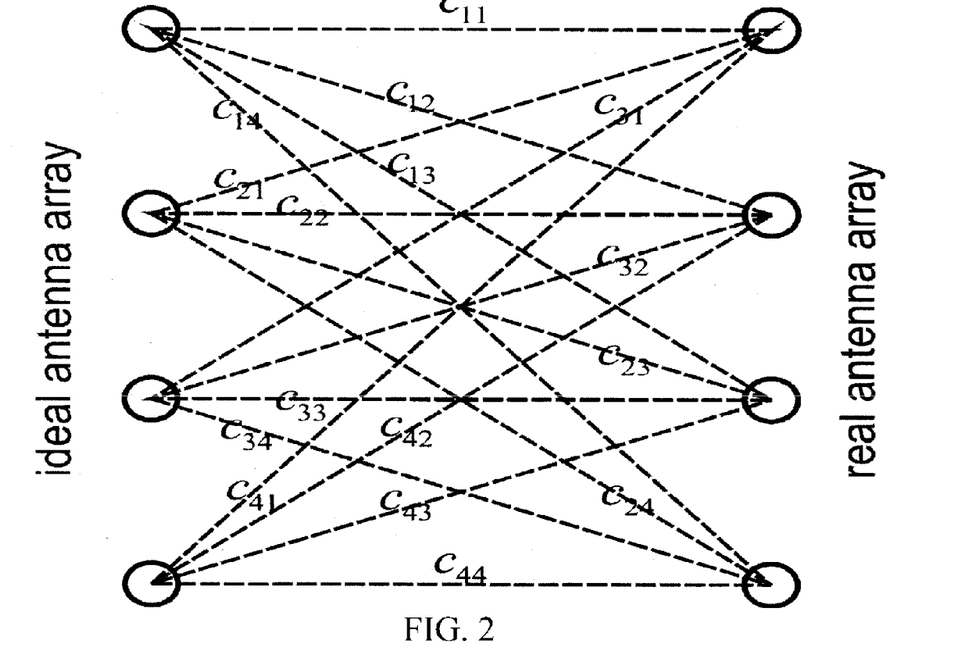

FIG. 2 shows a group/array of four antenna elements with connecting factors $c_{mn}$, forming an ideal antenna group on a model close to the reality. Thus, the reception model is developed to:

$$X = C \cdot A \cdot (F \otimes B) + N. \quad (4)$$

The coupling matrix C in the procedure according to the invention is preferably found by calibration, which is preferably implemented by self-structure analysis.

Calibration using self-structure analysis is based on the fact that the observed vector of beam formation has one source by multiplying the complex coupling matrix by the ideal vector of beam formation:

$$A_{estim} = C \cdot A \quad (5)$$

Thus, the ideal vector of the beam formation can be found, as far as C is known. Otherwise, C can be found in case of sufficiently uniformly distributed ideal vectors for beam formation and their corresponding observed vectors of beam formation.

The vector for beam formation is estimated by dividing the dominant eigenvector (main eigenvector) $A_{estim}$ to the covariant matrix $R_{xx}$ that is formed by a limited number of reception values. In the process of calibration, the main eigenvector is compared with its corresponding ideal vector for beam formation A. In J. Pierre and M. Kaveh, "Direction-Finding Using a Laboratory Experimental Array Testbed", 5th ASSP Workshop on Spectrum Estimation and Modeling, pp. 114-118, 1990 and "Experimental Performance of Calibration and Direction-Finding Algorithms", IEEE Int. Conference on Acoustics. Speech and Signal Processing, vol. 2, pp. 1365-1368, 1991, this results in the minimization problem:

$$\min_{C^{-1}} \| C^{-1} A_{estim} - A \|_F \quad (6)$$

where $\|\cdot\|_F$ describes the Frobenius norm. According to S. Kay, Fundamentals of Statistical Signal Processing—Estimation Theory. Prentice Hall, Inc., 1993, this issue may be resolved by $$C^{-1} = A A_{estim}{}^H (A_{estim} A_{estim}{}^H)^{-1} \quad (7)$$

In L. Kühnke, "Realisierung and Kalibrierung aktiver Antennensysteme mit digitaler Strahlformung", Ph.D. dissertation, University of Hannover, 2001, it is stated that this use is adjusted only if C describes a diagonal matrix (negligible antenna connection).

If the antenna connecting can not be ignored and must be compensated, then the angle dependent proportionality between the ideal vector for beam formation and the main eigenvector $R_{xx}$ must be examined (see L. Kühnke, "Realisierung and Kalibrierung aktiver Antennensysteme mit digitaler Strahlformung", a.a.O). Minimization problem is obtained for $$\min_{C, \Lambda} \| C A - A_{estim} \Lambda \|_F \quad (8)$$

with the proportionality matrix $$\Lambda = \mathrm{diag}\{g_1, g_2, \ldots, g_N\} = \mathrm{diag}\{g\} \quad (9)$$

Similarly to (7), the solution is given by $$C = A_{estim} \Lambda A^H (A A^H) \quad (10)$$

In C. See, "Sensor Array Calibration in the Presence of Mutual Coupling and Unknown Sensor Gains and Phases", Electronic Letters, vol. 30, pp. 373-374, 1994, Λ is calculated by the smallest eigenvalue of $$((A_{estim}{}^H A_{estim}) \Box P^T) z_{min} = \lambda_{min} z_{min} \quad (11)$$

with $$P = E - A^H (A A^H)^{-1} A \quad (12)$$

The respective eigenvector $z_{min}$ is used as an estimate of vector g.

Thus, the coupling matrix C for the case of negligible antenna connection is given by equation (7), in the other case by equation (10). If the calibration is done by multiple reception vectors, i.e. multiple vectors for beam formation, then optimization the coupling matrix C by several equations (6), respectively. (8), is carried out.

In L. Kühnke, "Realisierung und Kalibrierung aktiver Antennensysteme mit digitaler Strahlformung", a.a.O, calibration is considered for use with active antenna systems operating in the frequency range of around 12 GHz and using two-dimensional groups/arrays. Calibration is done in measuring chamber and thus it is done in a laboratory. By the high frequency range and low wavelengths compared to the current application, this is also possible there. Additionally, in L. Kühnke, "Realisierung und Kalibrierung aktiver Antennensysteme mit digitaler Strahlformung", calibration is carried out only for a limited number of fixed reference angles (e.g. 4, 8 or 16), for which the message assessment is sufficient. In this application, however, as far as calibration takes place in the field of moving objects, it is formed to a large number with random angles. To improve the results, it is attempted preferably to achieve uniform distribution of the messages included in the calibration, along the range of angles related to the calibration. In contrast to this, according to the subject of this patent application, calibration in the area with moving objects can also be done. This is an advantage because more frequent new calibration is possible as costs are lower (the equipment can remain at the place of installation). Another advantage is that inaccuracies in the assembly are calibrated.

For calibration, multiple sources to identify the corresponding positions/angles of falling can generally be used. Relevant information can be found, for example, by the ADS-B messages or by additional information for the airspace control (e.g. primary radar) or by measuring flights (with the appropriate display of data).

In a complementary form of the procedure according to the invention (according to claim 26) as a coupling matrix C, a unitary matrix is used, where the calibration procedure may not be necessary. Thus calibration costs and costs for storage of relevant data are eliminated. This simple way of working can be used for example in cases where the estimation of the direction has low accuracy.

Knowing the matrix F is not a prerequisite for the use of algorithms for the estimation of the direction of the basis of equation (4) and the reception model present in it, and it is used for modeling of the compensation of the frequency of medium, respectively the resulting phase division in order to compare the algorithms with each other and their productivity.

Over the past three decades, algorithms for estimation of the direction were examined continuously and there is a wide range of different algorithms. For a given problem situation and determining the direction of meeting the SSR signals, four different algorithms were selected according to the invention and they were tested accordingly:

- "Multiple Signal Classification (MUSIC)" by R. O. Schmidt, "Multiple Emitter Location and Signal Parameter Estimation," in IEEE Transactions on Antennas and Propagation, vol. 3, 1986,
- "Estimation of Signal Parameters via Relational. Invariance Techniques (ESPRIT)" by R. Roy. and T. Kailath, "ESPRIT—Estimation of Signal Parameters via Rotational Incariance Techniques," in IEEE Transactions on Antennas and Propagation, vol. 7, pp. 984-995, 1989,
- "Non-Circular (NC) Unitary ESPRIT" от M. Haardt ИF. Roemer, "Enhancements of Unitary Esprit for Non-Circular Sources," in ICASSP Conference, 2004 and
- "Matrix Pencil" by Y. Hua and T. Sarkar, "Matrix Pencil Method for Estimating Parameters of Exponentially Damped/Undamped Sinusoids in Noise," IEEE Transactions on Acoustics, Speech and Signal Processing, vol. 38, pp. 814-824, 1990.

NC Unitary ESPRIT is then examined for related ESPRIT, since it is limited to signals that concentrating its modulation alphabet to a few degrees of the complex plane. This special case is fulfilled by all purely amplitude modulated signals, as well as by SSR signals.

This is with all four algorithms for subspace based method which, unlike the spectral-based method is consistent and has good statistical properties (see M. Viberg and H. Krim, "Two Decades of Statistical Array Processing Research," in Signals, Systems & Computers, 1997. Conference Record of the Thirty-First Asilomar Conference on, vol. 1, 2-5 Nov. 1997, pp. 775-777 vol. 1). Except for MUSIC, all the algorithms require a linear group/array with the same distance between antennas (Uniform Linear Array-ULAs). MUSIC assesses the direction of falling not directly, but provides the so-called pseudo-spectrum from which those directions should be identified. The algorithms used here for searching in the pseudo-spectrum are not optimal, which results in degradation of the RMSE (Root Mean Squared Error). With improved search algorithm MUSIC, gives similar results as ESPRIT in case of an ideal antenna group.

In the passive system to prevent collisions under US 2005/0024256 A1, a zero ZF concept is used, i.e. input signal is directly mixed analogously (if necessary, through an intermediate frequency) in the main band and only there it is digitized and converted into the complex main bar. With the subject of this application for a patent, however, analog mixing takes place at an intermediate frequency, it is digitized by analog-to-digital converter, and only then it is converted in the main band by the configurable signal processor FPGA/DSP. This gives apparent advantage of the higher accuracy of the assessment, as contrary to the solution under US 2005/0024256 A1, different amplifications and times of the I and Q components are not present. Furthermore, the passive system for preventing collisions under US 2005/0024256 A1 is based on interrogation signals from a rotating radar source, while in this invention operation can also take place with interrogation signals from one antenna group.

In order to assess the stability of estimation algorithms to hardware influences and compensation of the media, below only the case of a separate not stored signal is considered. As far as the algorithms are used with a projection algorithm in the lower spaces, as presented for example in N. Petrochilos, G. Galati, L. Men, and E. Piracci, "Separation of Multiple Secondary Surveillance Radar Sources in a Real Environment," in SAM Conference, 2006, this is not a limitation in the general case.

All simulations are based on the reception model given in equation (4). The used antenna group A consists of four omnidirectional antenna elements AE at a distance of half a wavelength. The distance of interference (SNR) is set at 40 dB and 50 values from the review for one estimation are used. The angle of falling is randomly selected between 80° and 100°.

Figure 3:
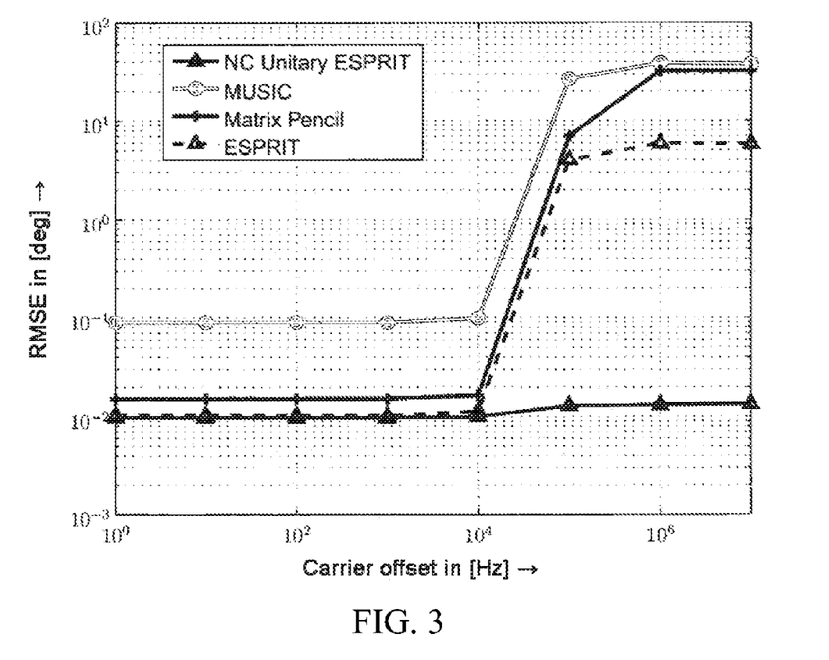

FIG. 3 shows that the accuracy of estimation cannot be decreased to the compensation of the medium of 10 kHz. If this value is crossed, then the accuracy with all algorithms, except with NC Unitary ESPRIT is obvious, and a maximum RMSE value is reached at 1 MHz. This maximum is almost equal for MUSIC and Matrix Pencil and it is between 30° and 40°. In ESPRIT, the value is clearly lower at about 6°. NC Unitary ESPRIT shows almost complete lack of being influenced and thus can be described as an optimal algorithm for assessment of the direction of an individual SSR signal.

Figure 4:
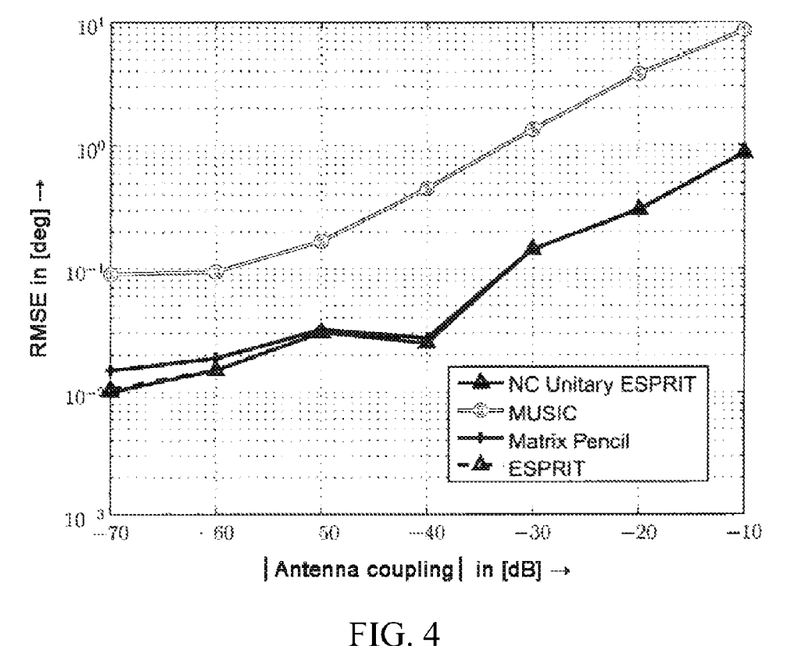

The results of the simulated connection between antenna elements AE are presented in FIG. 4. The connection $c_{neignb}$ in [dB] given in the description of the axles (in terms of power) is defined between two adjacent antenna elements AE. Connection with two further located elements AE is parameterized in the absence of a model with the values up to the group of values measured by us $$c_{13}=c_{31}=c_{24}=c_{42}=c_{nejghb}-6.6[dB]$$

$$c_{14}=c_{41}=c_{neighb}-19.35[dB]. \quad (13)$$

It is clear that none of the four algorithms is stable at connection of antenna elements AE, and all the algorithms except MUSIC show the same accuracy of assessment. Nevertheless, the deviation from the accuracy of estimation is not as big as with the increasing compensation of medium and RMSE less than 1° to ensured with connection $c_{nejghb}$=40 dB.

Figure 5:
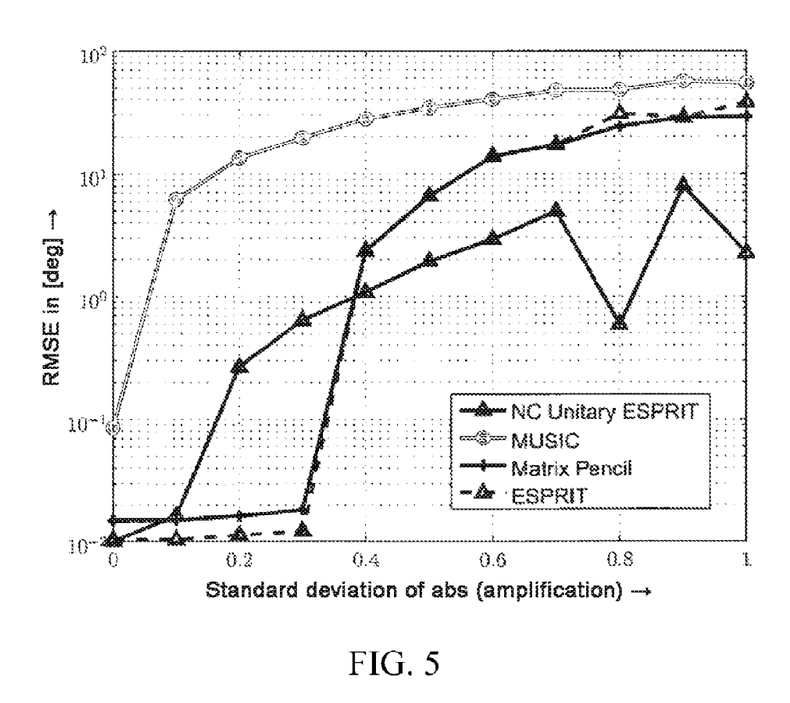

The analog input levels connected to the antenna elements AE have different complex amplification factors. The influence of the different absolute values of amplification is presented in FIG. 5. The nominal amplification of the input levels and the distributed compensation for amplification is characterized by an increasing standard deviation. MUSIC is the least reliable and loses lost with the standard deviation 0.1 in terms of accuracy of the estimation. NC Unitary ESPRIT starts to lose accuracy from 0.1 and ESPRIT and Matrix Pencil—from 0.3. However, breaking the accuracy of the estimation is not great. All algorithms without MUSIC exceed RMSE of 1° slightly less than 0.4.

Figure 6:
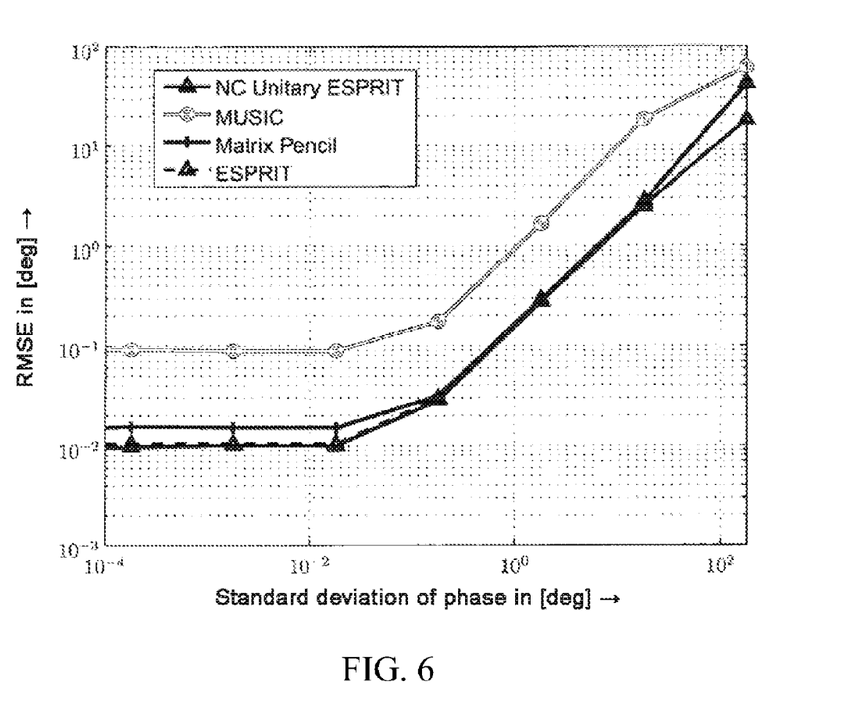

On FIG. 6, results with non-homogenous phase course show in the same RMSE results for all algorithms except MUSIC. All algorithms are similar with a different phase course. The accuracy of the estimation is worsened at standard deviation of $10^{-4} \cdot \pi$.

The construction of measurement being used is based on ULA from six single pole elements at a distance of half a wavelength (this is not shown the drawing), in which only four internal elements are used for assessment of the direction. The other two elements are completed with 50Ω, and are used to homogenize the characteristics of individual elements. Each single pole has a reflector in the shape of halfway tube with a diameter of half a wavelength. On one hand the reflector results in a greater effect on the direction, and on the other hand, the connection of elements is minimized. Thus, good fitting and disconnection is achieved. Both values are at about −17 dB.

According to FIG. 4, it must be possible to achieve RMSE of 0.4° with this antenna group/array A. The reception model is parameterized by the measured coupling matrix of our antenna group A and the amplification factors of the analog input levels determined by a networking catalyst. Since the occurring compensation of the medium is not known in advance, it is regarded as a variable. The results of the four algorithms applied in this model can be seen in FIG. 7.

Figure 7:
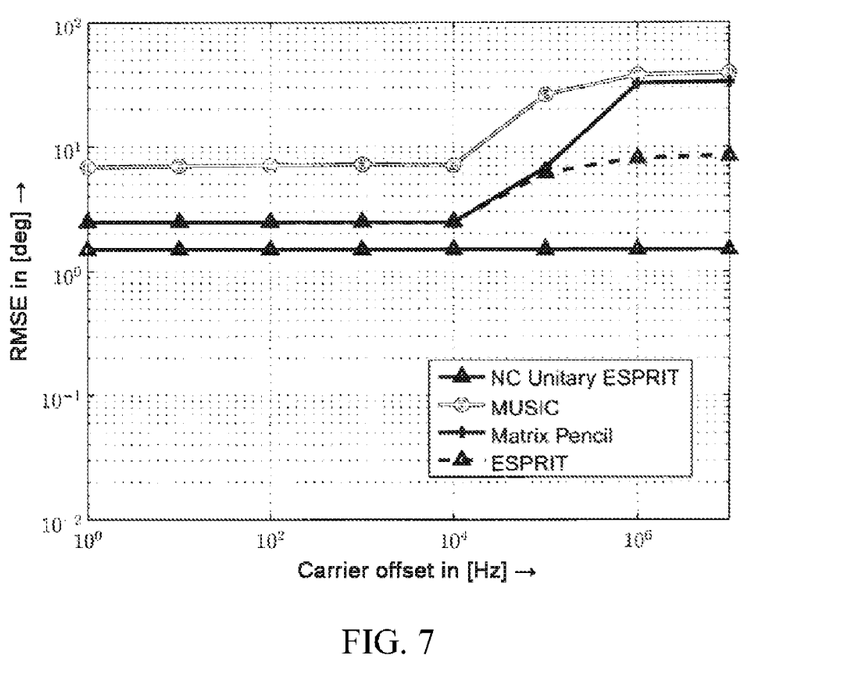

NC Unitary ESPRIT appears to be slightly weaker than the ESPRIT and Matrix Pencil, as far as compensation of the medium is below 10 kHz. One possible reason for this is that the accuracy of NC Unitary ESPRIT is dominated by non-homogenous amplification of the input levels (see FIG. 5), resulting in RMSE of 0.7°. ESPRIT and Matrix Pencil are more reliable with RMSE of 0.3°. The high compensation of the medium is the limiting factor for ESPRIT, Matrix Pencil and MUSIC, while NC Unitary ESPRIT here shows a constant accuracy of assessment. MUSIC results in values above 10° RMSE in all values of the compensation of the medium and thus appears to be suitable only for special applications.

Figure 8:
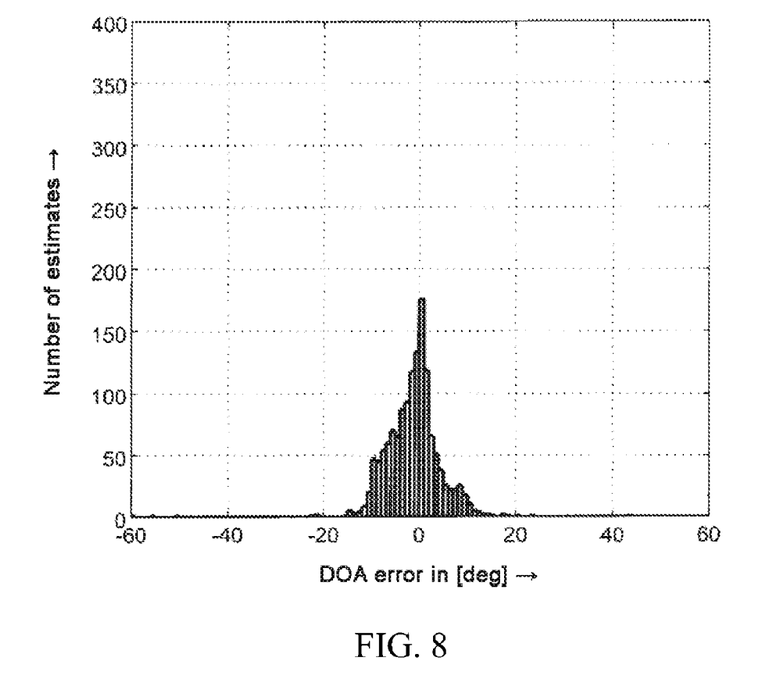
Figure 9:
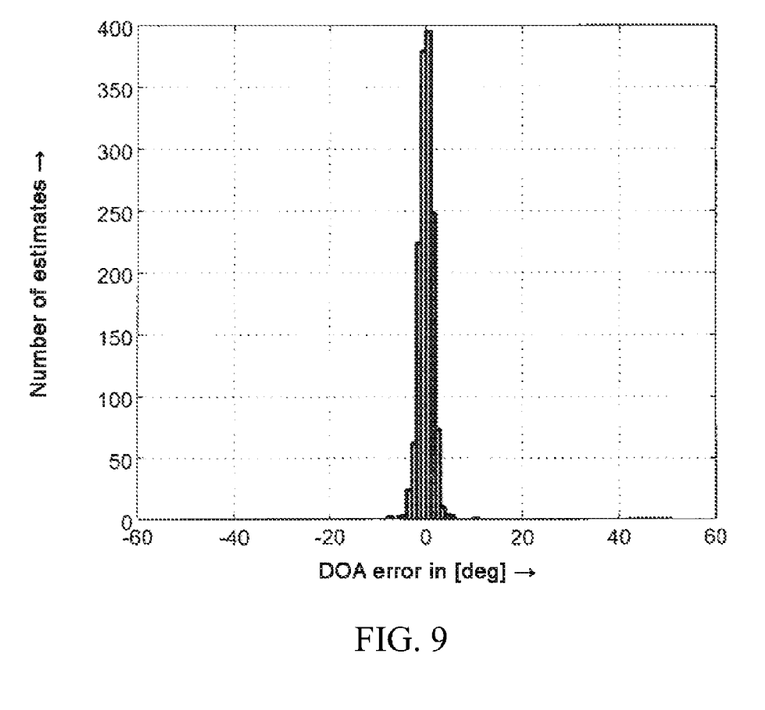

As ADS-B messages contain the found position of the airplanes via GPS on board, they are well suited for reference in assessing the direction. In the test measurement, 2000 extended squitter ADS-B messages from S mode were collected. The four algorithms were tested with this data set. The results of ESPRIT and NC Unitary ESPRIT are shown in FIG. 8 and FIG. 9.

While there are changes in the error estimation in both algorithms, as a whole NC Unitary Esprit shows higher accuracy than ESPRIT. Changes may arise from transferred messages, which do not lead to ISI in the cap of the ADS-B message. The message is identified in this way as an ADS-B message, however the coded position may contains an error. The result is a wrong reference orientation and in these circumstances, a big estimation error is calculated.

However, to obtain comparison by RMSE values between ESPRIT and NC Unitary ESPRIT, only the best 1900 from 2000 assessments of the direction are taken into account. In ESPRIT thus RMSE of 6.96° is obtained, while with NC Unitary ESPRIT the RMSE is 4.45°. If a compensation of the medium 1 MHz is taken, then the result in ESPRIT fits well to the results from the simulation in FIG. 7. NC Unitary ESPRIT, however, shows clearly a lower accuracy than the simulated 0.7°.

Through simulations it is show that the imperfections of hardware affect with a different strength the achievable accuracy of estimation according to the algorithm and the concerned part of the hardware. While the comparison between ESPRIT and NC Unitary ESPRIT in terms of the hardware shows a slight advantage of ESPRIT for non-homogeneous input levels with similar accuracy, NC Unitary ESPRIT is shown to be more reliable at the present compensation of the medium.

Test with real reception signals confirms the superiority of NC Unitary ESPRIT over ESPRIT in the present scenario. NC Unitary ESPRIT, according to the simulation, has to show a RMSE value with 4° lower. MUSIC and Matrix Pencil, based on their less reliability, appear to be suitable for special applications in comparison to the compensation of the medium.

Figure 10:
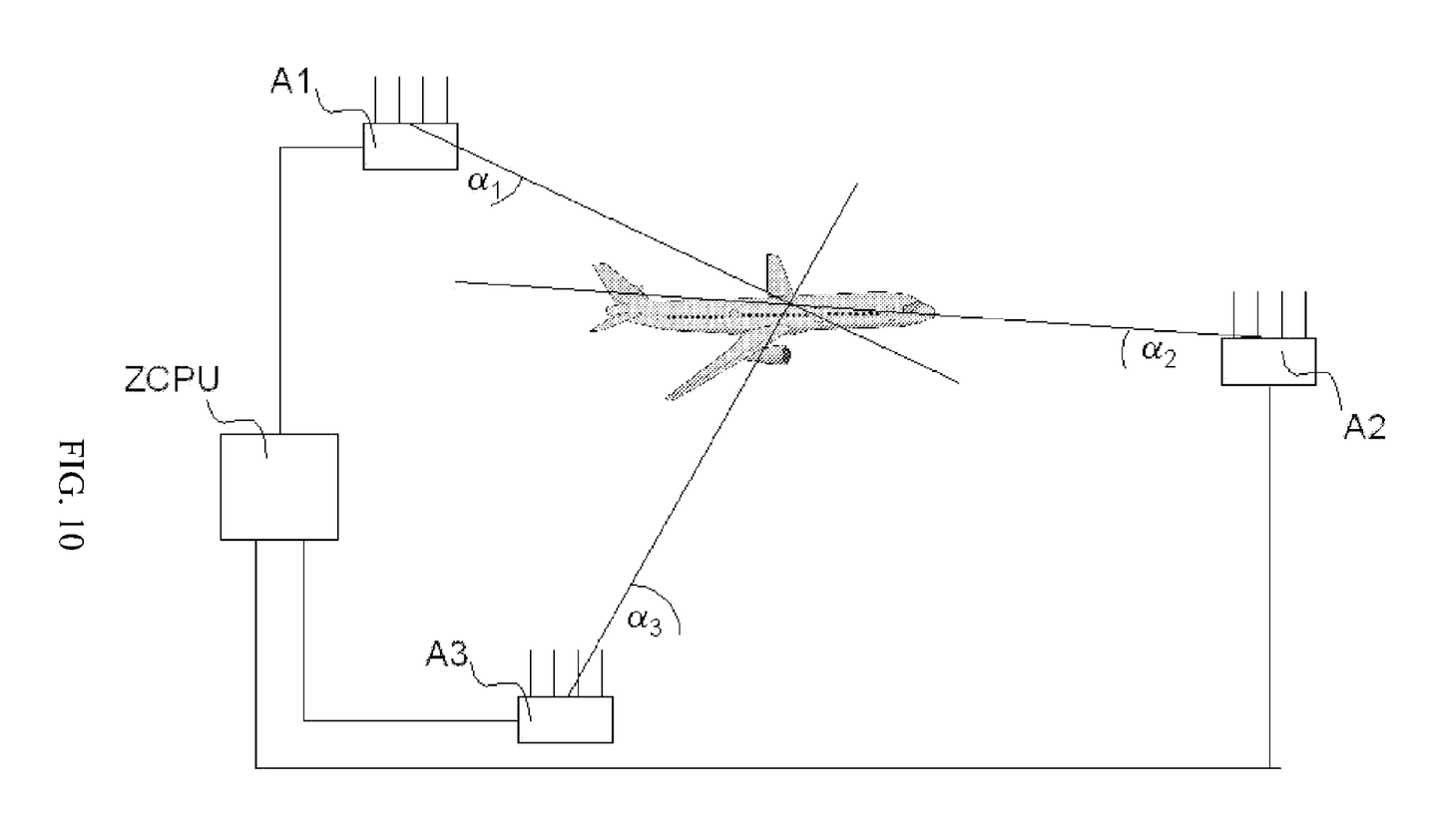

FIG. 10 shows the determination of the position of an airplane by crossing arrows, based on the individual results from the estimation of the direction of several devices of antenna groups. The central processing unit GCPU calculates the position of the airplane on the basis of direction angles given by individual groups as the point of connection of the corresponding lines, respectively. surfaces (of FIG. 10 for reasons of simplicity only lines are marked, in fact, however, by consideration the azimuth and elevation, the relevant planes are obtained, which are generally curved). For the calculation, methods known by specialists may be used.

Figure 11:
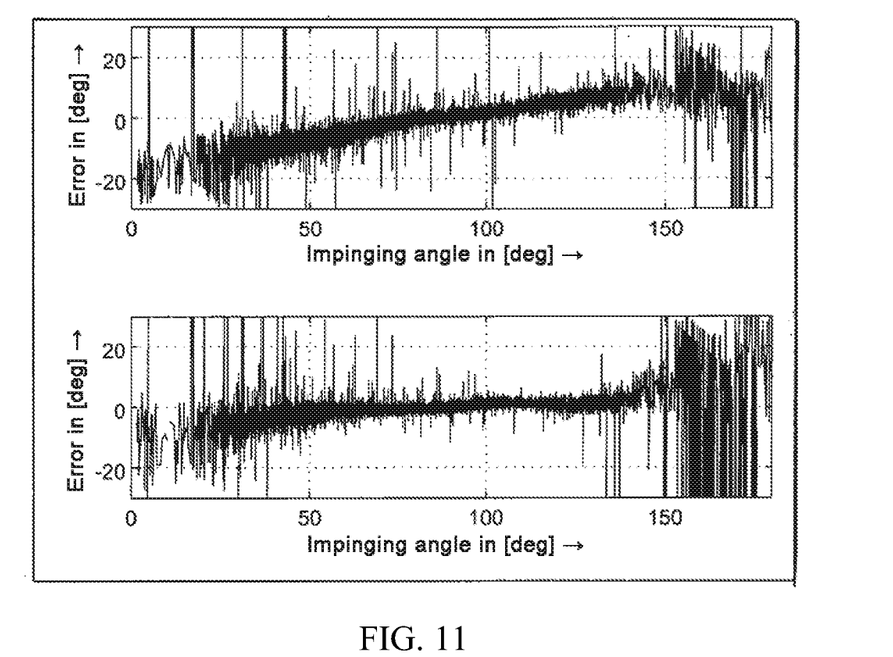
Figure 12:
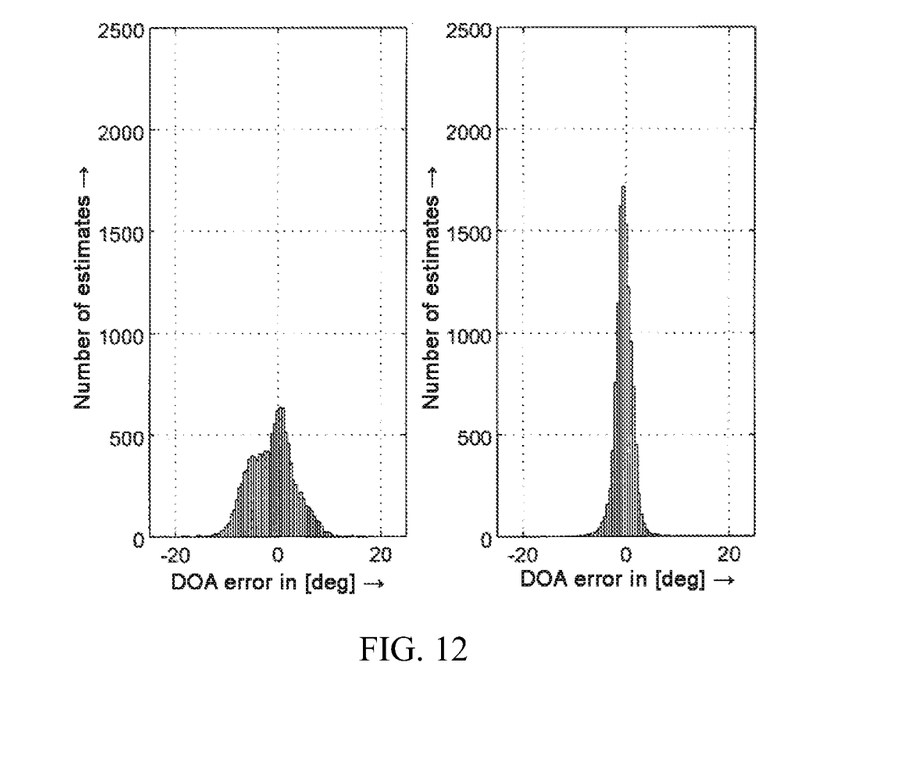

FIG. 11 and FIG. 12 show improvements in the estimation of the direction by means of calibration. FIG. 11 shows the error in estimating the angle of falling (DOA: Direction of Arrival) to the angle of falling in the use of ESPRIT, here based on 14 222 received ADS-B messages from the airspace. The upper part of the diagram shows the results for the uncalibrated case, the lower part—the calibrated case. Similarly, FIG. 12 shows the histogram uncalibrated (left) and calibrated (right) case in the use of ESPRIT based on the 11642 received ADS-B messages from the airspace, in which the angles are falling are in the range of 45° to 135°. To find the calibration matrix C is used a second data set from 707 ADS-B responses with angles of falling 40° to 140°, where the angles are distributed evenly only approximately over this range. For the lowest possible error in DOA reference caused by inaccuracies in the transmitted via ADS-B positions, it is necessary for this data set to have a minimum distance of 30 km for the reference plane.

FIG. 11 and FIG. 12 show a systematic reduction of error compared to the uncalibrated case. While here ESPRIT in the uncalibrated case gives another error (RMSE: effective value of the angular error) of about 6°, then this in case of calibration is significantly improved to 2.1°, i.e. nearly one third. In NC Unitary ESPRIT in this use, in the uncalibrated case, an accurate assessment of the direction is achieved. But here also one more visible improvement is achieved by the calibration. The error is reduced from 1.6° to 1.08°. The accuracy of estimation of the direction can be further be improved, for example by using special measuring airplanes for calibration, which give reliable reference signals, reliable data for the position, respectively.

Along with taking into account the shortcomings of the hardware, calibration can be used also for taking into account effects such as aging of components (generally long-term), temperature or moisture (generally faster and more often fluctuating) or wind power which, by vibrations. can change the positioning of the beam and the beam formation of the group. The use of measurement flights for calibration is more suited for calibration against aging (e.g. every 1-3 years), calibration using ADS-B messages or for supplementing information on the control of the airspace (e.g. primary radar); it generally can be done more frequently and makes calibration possible with view to the temperature and humidity. Various scenarios for the preparation of calibration matrices and storing them can be considered and, depending on the current corresponding parameters, the relevant matrix can be selected. In this relation, it is possible to use the appropriate sensors (e.g. temperature, humidity, wind) within the invention. In particular, the development of these devices is possible and its purpose is creating cost-effective devices and their use, where devices are formed in a way that it is not possible to take into account short-term fluctuating parameters such as temperature and humidity, but generally only long-term effects like aging are taken into account.

The invention is not limited to the described and presented examples of implementation, but it also covers all implementations being equivalent in the sense of the invention. For example, in the context of the invention, a circular antenna circuit with equal distances between antennas UCA (Uniform Circular Array) can be used.

The invention claimed is:

1. A device for improved directional estimation and/or decoding by means of secondary radar signals, which comprises:
    at least one array (A) comprising M antenna elements (AE);
    a low noise linear amplifier (LNA) and first bandpass filter (F1) combination connected to a plug-in connector (S) of the respective antenna elements (AE) in the array;
    a first linear amplifier (V1) being connected at a filter output of said combination for amplifying the band-limited signal;
    a mixer (M) connected to the first linear amplifier (V1) for the frequency conversion into a ZF region;
    a second linear amplifier (V2) and second bandpass filter (F2) combination connected to the mixer output for amplifying and limiting the bandwidth of the signal in the ZF region;
    a first analog-to-digital converter (AD1) connected to the second bandpass filter (F2) for scanning and quantifying the filter output signal;
    a configurable signal processor (FPGA) connected to the first analog-to-digital converter (AD1), said processor being connected to a PLL-VCO circuit for controlling the mixer frequency and receiving data for processing; and
    a processing unit (CPU) connected to the configurable signal processors (FPGA), said unit collecting the data (DD) from all antenna elements (AE) and carrying out the directional estimation by means of a method based on a subspace in which the various gains, phase differences and coupling of antenna elements in the analog input devices connected to the M antenna elements (AE) are taken into account both in estimating the direction and in the detection of received radio data.

2. The device according to claim 1, wherein a subregionally based method selected from the group consisting of Multiple Signal Classification (MUSIC), Estimation of Signal Parameters via Relational Invariance Techniques (ESPRIT), Non-Circular (NC) Unitary ESPRIT and Matrix Pencil is used.

3. The device according to claim 1, wherein a third linear amplifier (V3) for amplifying of low-level signals is connected to the second bandpass filter (F2), and a second analog-to-digital converter (AD2) is connected to said third linear amplifier (V3).

4. The device according to claim 1, wherein the antenna array (A) comprises at least three omnidirectional antenna elements (AE), which are formed as a linear array (A) with equal distances of half a wavelength between the antennas.

5. The device according to claim 4, wherein the antenna elements (AE) are equipped with a reflector in the form of a half way tube with a diameter half a wavelength, where both adapting and decoupling is implemented.

6. The device according to claim 4, wherein the antenna elements (AE) are formed as frame antennas on a supporting plate and a rear side of the supporting plate has a metal surface for shielding.

7. The device according to claim 1, wherein a radioreceiver (FE) and/or wired interface device (TZ) is connected to the configurable signal processors (FPGA) for supplying time synchronization.

8. A device for determining position and/or decoding, based on secondary radar signals, which comprises:
    at least two arrays (A1, A2, A3) comprised of M antenna elements (AE);
    a low noise linear amplifier (LNA) and first bandpass filter (F1) combination connected to a plug-in connector (S) of the respective antenna element (AE);
    a first linear amplifier (V1) being connected at a filter output of said combination for amplifying the band-limited signal;
    a mixer (M) connected to the first linear amplifier (V1) for the frequency conversion into a ZF region;
    a second linear amplifier (V2) and second bandpass filter (F2) combination connected to the mixer output for amplifying and limiting the bandwidth of the signal in the ZF region;
    a first analog-to-digital converter (AD1) connected to the second bandpass filter (F2) for scanning and quantifying the filter output signal;
    a configurable signal processor (FPGA) connected to the first analog-to-digital converter (AD1), said processor being connected to a PLL-VCO circuit for controlling the mixer frequency and receiving data for processing;
    a processing unit (CPU) connected to configurable signal processors (FPGA), which collects data (DD) from all antenna elements (AE) and makes an assessment of the direction by a subregionally based procedure; and
    a central processing unit (GCPU) connected to the processing units (CPU) of the arrays (A1, A2, A3) which collects information on the estimation of direction from the connected processing units (CPU) and determines the position by means of cross bearing in which the various gains, phase differences and coupling of antenna elements in the analog input devices connected to the M antenna elements (AE) are taken into account both in estimating the direction and in the detection of received radio data.

9. The device according to claim 8, wherein for M=3 the array (A1, A2, A3) is located in the form of an isosceles triangle, while for M=4 the group (A1, A2, A3) is located in the form of a square.

10. A method for the estimation of the direction and/or decoding of secondary radar signals, with at least one array (A) comprising M antenna elements (AE) and connected to the M antenna elements (AE) analog input devices with linear amplifiers (LNA, V1, V2, V3), band filters (F1, F2), a mixer (M), analog-to-digital converters (AD1, AD2), configurable signal processors (FPGA) and a processing unit (CPU), the method comprising:
generating by one of the signal processors (FPGA) first and second clock signals (CK1, CK2) as a normal time for the mixer (M) and analog-to-digital converter (AD1, AD2),
applying a coherent analog and digital signal processing in the processing unit (CPU) connected to the signal processors (FPGA), which collects data (DD) from all antenna elements (AE) and makes an estimation of the direction by a method based on a subspace and
taking into account various gains, phase differences and coupling of antenna elements in the analog input devices connected to the M antenna elements (AE) both in estimating the direction and in detecting of the received radio data.

11. The method according to claim 10 with equipment consisting of a minimum of two groups (A1, A2, A3) consisting of M antenna elements (AE) and a central processing unit (GCPU) connected to the processing units (CPU) of the groups (A1, A2, A3), wherein said central processing unit (GCPU) collects information for assessment of the direction from said connected processing units (CPU) and carries out cross-finding of the position.

12. The method according to claim 10, wherein different numbers of noises are taken into account with a subregionally based procedure for determining the direction and the position.

13. The method according to claim 10, wherein a subregionally based procedure selected from the group consisting of Multiple Signal Classification (MUSIC), Estimation of Signal Parameters via Relational Invariance Techniques (ESPRIT), Non-Circular (NC) Unitary ESPRIT and Matrix Pencil is used.

14. The method according to claim 13, wherein in the procedures for assessment of the direction according to MUSIC, directions of supplying are not assessed directly, but a pseudo-spectrum is found and by it the directions are determined.

15. The method according to claim 10, wherein an equivalent complex base band is mixed in mixer (M) and then digital low pass filtering takes place.

16. The method according to claim 10, wherein ADS-B messages, which contain the position found by location with a satellite (Global Position System GPS) on board of an airplane, is used as a reference.

17. The method according to claim 10, wherein a group/array of antennas (A) with M antenna elements distributed in rows or a plane is used.

18. The method according to claim 10,
characterized by its use for the assessment of the direction and/or assessment of the altitude.

19. The method according to claim 10, wherein the assessment of the information on the position and data for the transition of the CPU unit, in which they are received, are processed by signal processors (FPGA) as the positional information.

20. The method according to claim 19, wherein the data package in the processing unit (CPU) is stored at certain intervals circularly and/or cyclically.

21. The method according to claim 10, wherein signal processors (FPGA) in accordance with specified time distance or when reaching the predetermined distance occupy two or more positions and they are sent in a data package to the processing unit (CPU).

22. The method according to claim 10, wherein for the assessment of the reception model the following equation is used:

$$X = C \cdot A \cdot (F \otimes B) + N$$

where X (M×N) is the reception matrix; A (M×d) the matrix of beam formation (steering matrix), C (M×M) is the coupling matrix, F (d×N) is a phase shift matrix, and matrix B (d×N) contains the symbols of the transmission, and the N matrix the additional white noise where ⊗ is the product of the two matrices.

23. The method according to claim 22, wherein the coupling matrix C is found by calibration, carried out by a self-structure analysis, which is done in accordance with the multiplication of the complex coupling matrix C by the ideal vector for the beam formation, according to:

$$A_{estim} = C \cdot A$$

where $A_{estim}$ is the dominant eigenvector (main eigenvector of the covariant matrix $R_{xx}$ is formed by a limited number of reception values and A describes the corresponding ideal vector of beam formation.

24. The method according to claim 22, wherein during the process of calibration a main eigenvector $A_{estim}$ is compared with its corresponding ideal vector for beam formation A and the resulting minimization problem:

$$\min_{C^{-1}} \| C^{-1} A_{estim} - A \|_F$$

where $\|\cdot\|_F$ describes the Frobenius norm, is solved with the equation $$C^{-1} = A A_{estim}^H (A_{estim} A_{estim}^H)^{-1}.$$

25. The method according to claim 22, wherein a unitary matrix is used as a coupling matrix using, obtained in the storage device.

26. The method according to claim 22, wherein by the use of temperature sensors and humidity sensors a choice is made among several stored calibration matrices.

* * * * *